United States Patent
McDougal

(10) Patent No.: US 8,875,220 B2
(45) Date of Patent: *Oct. 28, 2014

(54) PROXY-BASED NETWORK ACCESS PROTECTION

(75) Inventor: Monty D. McDougal, Saint Paul, TX (US)

(73) Assignee: Raytheom Company, Waltham, MA (US)

( * ) Notice: Subject to any disclaimer, the term of this patent is extended or adjusted under 35 U.S.C. 154(b) by 859 days.

This patent is subject to a terminal disclaimer.

(21) Appl. No.: 12/828,874

(22) Filed: Jul. 1, 2010

(65) Prior Publication Data

US 2012/0005719 A1   Jan. 5, 2012

(51) Int. Cl.
- *G06F 21/00* (2013.01)
- *H04L 29/06* (2006.01)
- *G06F 21/56* (2013.01)
- *G06F 15/173* (2006.01)
- *G06F 15/16* (2006.01)

(52) U.S. Cl.
CPC ............ *H04L 63/10* (2013.01); *H04L 63/0281* (2013.01); *G06F 21/562* (2013.01)
USPC .................................. 726/1; 709/224; 726/12

(58) Field of Classification Search
USPC ......................................... 726/1, 12; 709/224
See application file for complete search history.

(56) References Cited

U.S. PATENT DOCUMENTS

| | | | |
|---|---|---|---|
| 3,635,703 A | 1/1972 | Pissarevsky | |
| 5,462,575 A | 10/1995 | Del Corso | |
| 6,101,543 A * | 8/2000 | Alden et al. | 709/229 |
| 6,452,915 B1 * | 9/2002 | Jorgensen | 370/338 |
| 6,773,520 B1 | 8/2004 | Fehring et al. | |
| 7,664,857 B2 * | 2/2010 | Ovsiannikov et al. | 709/225 |
| 2001/0030970 A1 * | 10/2001 | Wiryaman et al. | 370/401 |
| 2002/0010866 A1 * | 1/2002 | McCullough et al. | 713/201 |
| 2002/0016851 A1 * | 2/2002 | Border | 709/234 |
| 2002/0034173 A1 * | 3/2002 | Border et al. | 370/338 |
| 2002/0035683 A1 * | 3/2002 | Kaashoek et al. | 713/154 |

(Continued)

OTHER PUBLICATIONS

U.S. Appl. No. 12/688,607 entitled "*System, Method, and Software for Maneuvering Computing Elements in a Distributed Computing Environment,*" inventors Suzanne P. Hassell et al., 49 pages including specification, claims, abstract, and drawings, filed Jan. 15, 2010.

(Continued)

*Primary Examiner* — Azizul Choudhury
*Assistant Examiner* — Tariq Najee-Ullah
(74) *Attorney, Agent, or Firm* — Schwegman Lundberg & Woessner, P.A.

(57) ABSTRACT

In certain embodiments, a method includes receiving, at a proxy, a request for access to a network from an application on an endpoint. The method also includes determining, by the proxy, information about the application on the endpoint by examining one or more headers of the request received at the proxy from the application. The method further includes determining, by the proxy, whether the one or more headers comprise expected information based on the determined information about the application. In response to determining that the one or more headers do not comprise the expected information, the method includes denying, by the proxy, the request for access to the network. In addition, in response to determining that the one or more headers comprise the expected information, the method includes forwarding, by the proxy, the request to the network on behalf of the application.

5 Claims, 5 Drawing Sheets

(56) References Cited

U.S. PATENT DOCUMENTS

| | | | |
|---|---|---|---|
| 2002/0147822 A1* | 10/2002 | Susai et al. | 709/229 |
| 2003/0026241 A1* | 2/2003 | Ono et al. | 370/349 |
| 2004/0098622 A1* | 5/2004 | O'Neill | 713/201 |
| 2005/0246716 A1* | 11/2005 | Smith et al. | 719/315 |
| 2005/0267947 A1* | 12/2005 | Patrick et al. | 709/217 |
| 2005/0276718 A1 | 12/2005 | Burgermeister et al. | |
| 2006/0123479 A1* | 6/2006 | Kumar et al. | 726/23 |
| 2006/0230154 A1* | 10/2006 | Nguyenphu et al. | 709/227 |
| 2007/0239886 A1* | 10/2007 | Montemayor et al. | 709/232 |
| 2008/0031258 A1* | 2/2008 | Acharya et al. | 370/395.42 |
| 2008/0069082 A1* | 3/2008 | Patrick | 370/351 |
| 2008/0178278 A1* | 7/2008 | Grinstein et al. | 726/12 |
| 2008/0181213 A1* | 7/2008 | Ovsiannikov et al. | 370/389 |
| 2009/0119382 A1* | 5/2009 | Bakker et al. | 709/206 |
| 2009/0129396 A1* | 5/2009 | Bakker et al. | 370/400 |
| 2011/0307490 A1* | 12/2011 | Chow | 707/741 |

OTHER PUBLICATIONS

U.S. Appl. No. 12/688,642 entitled "*System, Method, and Software for Maneuvering Computing Elements in a Distributed Computing Environment*," inventors William L. Gilmore et al., 49 pages including specification, claims, abstract, and drawings. filed Jan. 15, 2010.

U.S. Appl. No. 12/688,663 entitled "*System, Method, and Software for Maneuvering Computing Elements in a Distributed Computing Environment*," inventors Jeffrey J. Wiley et al., 50 pages including specification, claims, abstract, and drawings, filed Jan. 15, 2010.

U.S. Appl. No. 61/347,286 entitled "*System, Method, and Software for Analyzing Maneuvers of an Application in a Distributed Computing Environment*," inventors Suzanne P. Hassell et al., 49 pages including specification, claims, abstract, and drawings, filed May 21, 2010.

U.S. Appl. No. 12/828,785 entitled "*Dynamic Modification of the Address of a Proxy*," inventor Monty D. McDougal, 44 pages including specification, claims, abstract, and drawings, filed Jul. 1, 2010.

"Fast flux", from Wikipedia, the free encyclopedia, http://en.wikipedia.org/wiki/Fast_flux, 2 pages, Printed Sep. 1, 2010.

\* cited by examiner

PROXY-BASED NETWORK ACCESS PROTECTION

TECHNICAL FIELD

This disclosure relates generally to computer security and more particularly to proxy-based network access protection.

BACKGROUND

Malware (such as viruses, trojans, and other malicious software) has become an increasingly difficult problem to address. Various methods have been used to combat malware, but more sophisticated malware continues to abound. Methods of detection have grown more complex, but have also taken longer to execute as a result of this complexity. Even with such methods, endpoints continue to be compromised. While firewalls have protected access to networks from attackers, firewalls suffer problems with protecting networks from malware resident within a network instead of the network. This may leave networks and systems vulnerable.

SUMMARY

According to certain embodiments of the present disclosure, disadvantages and problems associated with previous techniques for network access protection may be reduced or eliminated.

In certain embodiments, a method includes receiving, at a proxy, a request for access to a network from an application on an endpoint. The method also includes determining, by the proxy, information about the application on the endpoint by examining one or more headers of the request received at the proxy from the application. The method further includes determining, by the proxy, whether the one or more headers comprise expected information based on the determined information about the application. In response to determining that the one or more headers do not comprise the expected information, the method includes denying, by the proxy, the request for access to the network. In addition, in response to determining that the one or more headers comprise the expected information, the method includes forwarding, by the proxy, the request to the network on behalf of the application.

In certain embodiments, the method may include selecting a policy based on the determined information about the application and determining the expected information according to the policy. Determining that the one or more headers do not comprise the expected information may include determining that the one or more headers contain at least one typographical error. The application may include a Web browser.

In certain embodiments, a method includes receiving, at a proxy, a request for access to a network from an application on an endpoint. The method also includes determining, by the proxy, the application's type based on the request for access to the network. In addition, the method includes determining, by the proxy, at least one instruction for the application to perform and not a user based on the application's type. Further, the method includes sending, by the proxy, the at least one instruction to the application in response to receiving the request for access to the network. Also, the method includes receiving, at the proxy, a response from the application to the at least one instruction. In response to determining that the response received from the application corresponds to an expected result, the expected result being a result expected to be generated by the application and not the user when performing the at least one instruction, the method includes forwarding, by the proxy, the request to the network on behalf of the application.

Certain embodiments of the present disclosure may provide one or more technical advantages. In certain embodiments, malware may be detected by a proxy. In certain embodiments, malware may be prevented from communicating with a network even after successfully compromising an endpoint.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
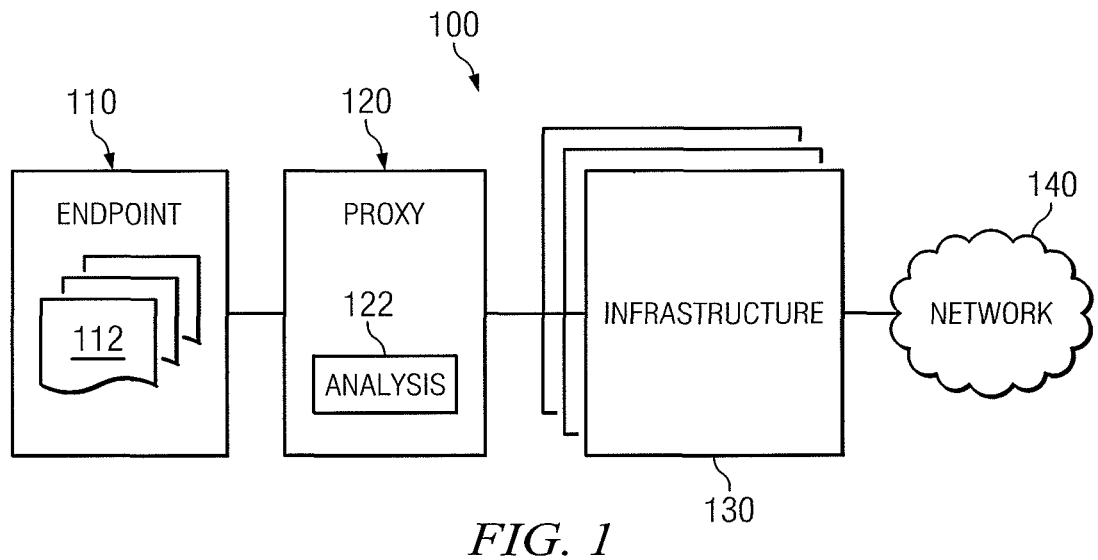
FIG. 1 illustrates one embodiment of an example system for proxy-based network access protection.

FIG. 1 illustrates one embodiment of an example system 100 for proxy-based network access protection. System 100 includes at least one endpoint 110 coupled to proxy 120. Proxy 120 includes analysis module 122. Proxy 120 is coupled to network 140. In some embodiments, proxy 120 is coupled to network 140 via infrastructure 130. Endpoint 110 includes one or more applications 112 that attempt to communicate with network 140. Proxy 120 may facilitate access by endpoint 110 to network 140, which may include controlling access by endpoint 110 to network 140. Although this particular implementation of system 100 is illustrated and primarily described, the present disclosure contemplates any suitable implementation of system 100, according to particular needs.

Endpoint 110 may include one or more computing devices. Such devices may include a computer, a personal computer, a workstation, a server, a kiosk computing device, a PDA, a mobile computing device, a laptop or notebook computer, a tablet computer, a mobile telephone, and/or a smartphone. Endpoint 110 may include any suitable combination of hardware, firmware, and software.

In some embodiments, endpoint 110 may include some or all aspects of computer system 300 of FIG. 3, described below in greater detail. System 100 may include any suitable number of endpoints 110. Endpoint 110 may include one or more applications 112 that communicate with network 140. Examples of applications 112 include Web browsers, e-mail clients, messaging clients, chat clients, file transfer clients, shell clients, or other applications that send information to or receive information from network 140. Endpoint 110 may be configured to direct communication with network 140 through proxy 120.

Proxy 120 may include any suitable combination of hardware, firmware, and software. Proxy 120 may include analysis module 122 which may be any suitable combination of hardware, firmware, and software. Operations that may be performed by analysis module 122 are described further below. Proxy 120 may include some or all aspects of computer system 300 of FIG. 3, described below in greater detail. System 100 may include any suitable number of proxies 120. Additionally, a single proxy 120 may service any suitable number of endpoints 110, infrastructures 130, and networks 140. Proxy 120 may be configured to receive requests (e.g., from endpoint 110) for resources on network 140, retrieve the requested resources, and provide the requested resources. For example, proxy 120 may receive a request for a Web page from endpoint 110. In response, proxy 120 may retrieve the Web page from network 140 and provide the requested Web page to endpoint 110. In some embodiments, this may be done in a manner that prevents the identity of the device (e.g., endpoint 110) requesting the resource from network 140 to be discernible by nodes on network 140. For example, if endpoint 110 requests a Web page from network 140, proxy 120 may retrieve the requested Web page on behalf of endpoint 110 such that the server on network 140 hosting the requested Web page cannot determine the identity of endpoint 110, such as its Internet Protocol (IP) address or its Media Access Control (MAC) address. The operations performed by proxy 120 described above may be performed using analysis module 122.

The requests received by proxy 120 from endpoint 110 may be generated by one or more applications 112 on endpoint 110. Proxy 120 may provide services for different application types. For example, proxy 120 may provide services for accessing Web pages, e-mail, file transfers, messaging or chat services, conferencing services, media streaming (audio or video), Voice-over-IP (VoIP) services, or other services that include sending information to or receiving information from network 140. In some embodiments, proxy 120 may provide multiple services using separate hardware devices or may provide multiple services using multiple software modules operating on the same hardware device. The operations performed by proxy 120 described above may be performed using analysis module 122.

In some embodiments, infrastructure 130 may include any suitable combination of hardware, firmware, and software that facilitates access to network 140. Infrastructure 130 may include one or more of: firewalls, routers, gateways, proxies, access points, hubs, servers, adapters, or other equipment suitable for facilitating communication. In some embodiments, network 140 may be a communicative platform operable to exchange data or information. In some embodiments, the network 140 may include packet data networks offering communication interfaces or exchanges between any two nodes in system 100. Network 140 may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. Network 140 may also include wireless technology such as WiMAX, LTE, or any of a variety of cellular data networks. In some embodiments, infrastructure 130 or network 140 may include firewalls or other equipment or software that create security zones and/or secure networks such as DMZs.

In operation, system 100 may provide for enhanced security when providing endpoint 110 access to network 140 by using proxy 120. The operations performed by proxy 120 described below may be performed using analysis module 122. For example, proxy 120 may analyze information received from endpoint 110 to determine information regarding the application 112 that is attempting to access network 140. As a particular example, proxy 120 may analyze header information sent from application 112 as part of a request for access to network 140. Proxy 120 may determine items such as the application's name, type, version, and other such information by analyzing the header information of the request. In addition, proxy 120 may further analyze the header information to determine if it is consistent with the information determined about application 112. Further details regarding this analysis is provided below.

In some embodiments, proxy 120 may enhance the security of network access. For example, a request for network access may be received at proxy 120 from endpoint 110. The request may be an attempt to: access a Web page, send or receive messages, upload or download one or more files, access a portion of network 140, initiate a streaming media session (such as a streaming audio session or a streaming video session), initiate or join a teleconference or video conference, make or receive a VoIP call or any other suitable request involving access to network 140.

Proxy 120 may examine headers present in the request. Such headers may vary, depending on the type associated with application 112 requesting access to network 140. The headers may include information regarding application 112 such as its name, type, and version. The headers may also include parameters, settings, commands, and capabilities according to the protocol employed by application 112. For example, if HTTP is employed, one aspect of the received headers may include MIME types as well as information regarding application 112 (e.g., browser name and version).

Proxy 120 may determine whether the headers include expected information. The expected information may be based on aspects of application 112 determined by examining the headers, such as the name, type, and/or version of application 112. The headers may be analyzed for both syntactical correctness and completeness. One or more policies may be referenced when making this determination. For example, proxy 120 may select a policy based on characteristics of application 112 determined from the headers, such as the name, type, and/or version of application 112.

In some embodiments, examining such characteristics of the headers may allow for the detection of malware present on endpoint 110 and attempting to connect to network 140. For example, the malware may be attempting to access a Web page or sending an e-mail message but would not properly form the headers since it is not truly a Web browser or an e-mail client. As another example, malware may be attempting to hide its traffic using protocols that a firewall already may be configured to allow (such as Web traffic, e-mail traffic, or instant messaging traffic). The types of inconsistencies for which the headers may be examined include typographical errors, formatting discrepancies, version number discrepancies, incorrect specification of MIME types when compared to the name and version of application 112 specified in the headers, and whether expected headers are missing. Such attempts to spoof headers by malware may be detected by proxy 120.

If it is determined that the headers include expected information consistent with the information determined about application 112, then, in some embodiments, proxy 120 will allow application 112 to access network 140. Proxy 120 may strip some or all of the information in the headers when allowing access to network 140. If the headers do not include the expected information, then, in some embodiments, proxy 120 may deny the request for access and potential remedial measures may be launched, such as scanning endpoint 110 for malware. Other remedial measures may include sending a message to an administrator and/or preventing endpoint 110 from accessing any network resources, including, but not limited to, proxy 120.

In another example operation, a request for network access from endpoint 110 may be received by proxy 120, and headers within that request may be analyzed by proxy 120 in a similar manner to that described above. Information regarding application 112 (such as name, version, and/or type) may be determined by proxy 120. Proxy 120 may send instructions (such as code) to application 112. The instructions may be determined based on the determined information about application 112, such as the type of application 112. For example, the instructions may include executable content that application 112 should be capable of performing if application 112 actually is the type of application it represents itself to be. Such instructions may be sent by proxy 120 in order to validate that application 112 can perform activities that are typical of the application's type. For example, if the request is for a Web page, then it may be determined that application 112 appears to be a browser. In such an example, the instructions sent may include instructions that a browser should be able to perform (such as executing JavaScript code, HTML code, Active-X code, XUL code, macros, Applescript, or other suitable scripting language, programming language, or set of instructions that the application can execute).

Proxy 120 may receive one or more responses from endpoint 110 to the sent instructions. Proxy 120 may analyze the responses to determine whether or not they are correct. In some situations, proxy 120 also may analyze whether the response was actually sent from endpoint 110 and not another entity. In some embodiments, responses may not be received by proxy 120 because application 112 may not have been able to perform the instructions. If malware on endpoint 110 were to have sent the request, then the malware may be attempting to access network 140 by pretending that it is another application, such as a Web browser. Hence the request to perform instructions may be difficult or impossible for the malware to complete since it is not truly a Web browser but merely masquerading as a Web browser.

If the responses from endpoint 110 are correct, then proxy 120 may allow application 112 to access network 140. In addition, in some situations, the responses should not only be correct but also should originate from the entity that originally requested access to network 140. As such, in some embodiments, proxy 120 may determine whether the response was actually submitted from endpoint 110 or from application 112. For example, proxy 120 may use one or more cookies with session identifiers to determine whether the responses were transmitted from the appropriate source. If the responses from endpoint 110 are not correct, then proxy 120 may deny application 112 access to network 140. In some situations, proxy 120 may allow application 112 to access network 140 even though the responses were not correct, but proxy 120 may also generate an alert (e.g., reflecting that this occurred). In some embodiments, if it is determined that the responses are correct, proxy 120 may determine to send further instructions that require responses. This may be repeated as needed. Whether or not to repeat these steps, and how many times the steps should be repeated, may be determined by one or more policies that may be selected based on the information about application 112 determined by proxy 120 (such as the name, type, and/or version of application 112). In some embodiments, if the responses are correct, a certificate or cookie may be given to application 112 by proxy 120 so that it may continue to access network 140 without needing to respond to instructions sent by proxy 120 since application 112 has already successfully responded to such instructions.

In another example operation, proxy 120 may receive a request for access to network 140 from endpoint 110, and analyze headers within that request. Information regarding application 112 (such as name, version, and/or type) that sent the request may be determined from such headers by proxy 120. Further, proxy 120 may determine whether the information determined from the headers indicates that application 112 is compliant with one or more policies. For example, based on the type, name, and/or version of application 112, one or more policies may be selected which may specify attributes that application 112 should have in order to gain access to network 140. This information may be compared to the headers present in the request by proxy 120. For example, proxy 120 may only allow a particular version of application 112 access to network 140. As another example, application 112 may have the correct version number but may not have the most recent patches or updates installed. As another example, permissions associated with a user of application 112 may be received by proxy 120 and compared to a policy before allowing access to network 140.

If it is determined that application 112 is compliant, then application 112 may be allowed access to network by proxy 120. If it is determined that application 112 is not compliant, then application 112 may be denied access to network 140 by proxy 120. In some embodiments, if the application is not compliant, further action may be taken at endpoint 110. For example, a scan for malware may be initiated or a scan for unapproved applications may be initiated. A message regarding the fact that application 112 was not compliant may be sent to an administrator. Application 112 may be sent or directed to a location where resources may be acquired to put application 112 into compliance. For example, a non-compliant browser may be sent to a Web page by proxy 120 where suitable upgrades and/or patches may be acquired. In another example operation, proxy 120 may receive request for access to network 140 and analyze headers within that request. Information regarding application 112 (such as name, version, and type) that sent the request may be determined by proxy 120. Proxy 120 may generate a key. The key may be generated based on an algorithm stored at the proxy and that is known to application 112. The key may be pseudorandom in that it uses both a randomly generated item or seed and an algorithm is applied to the randomly generated number or seed to produce the key. Such criteria for determining the key may be transmitted between application 112 and proxy 120 previously. In some embodiments, the criteria for generating the key may be determined when proxy 120 and/or application 112 are configured. The key may be static and determined at both application 112 and proxy 120 previously. In such cases, generating the key at this step may include retrieving the key from a local or remote location.

A key may be received by proxy 120 from application 112. In some cases, the key received may be received with the request for access to network 140. In some situations, the key may be received by proxy 120 before proxy 120 generates the key. The key may be generated by application 112 requesting the access to the network or by some other aspect of endpoint 110 and merely used by application 112. For example, a browser plugin may be used to generate the key. If the key is valid, then application 112 may be allowed access to network 140 by proxy 120. In some embodiments, proxy 120 may strip one or more headers from the request as it allows it to reach network 140 so as to prevent the key from being disclosed to others. If the key is not valid then application 112 may be denied access by proxy 120.

In situations where access is denied, further steps may be taken. For example, if the key is not valid, application 112 may be directed to resources that could provide compliance. A browser may be redirected to a Web page where the appropriate resources may be acquired in order to generate a valid key. One or more administrators may be contacted indicating the inability of application 112 to generate a valid key.

In another example operation, an address key may be provided to proxy 120. As an example, the address key may be a random element or number or some form of a unique identifier (such as a Media Access Control identifier). The address key may be a seed which may be used to determine a new address. The address key may be retrieved by application 112 and/or proxy 120 from a remote location. In some embodiments, the address key may be a static value that is present at proxy 120 and/or application 112. As another example, the address key may be generated by proxy 120 and then transmitted to application 112.

A new address for proxy 120 may be determined by proxy 120. The new address may be determined based on the address key. The address that is generated may be any form of a network address, including items such as an IP address or a Domain Name System (DNS) address. In some situations, both proxy 120 and application 112 will determine the new address based on the address key. For example, both application 112 and proxy 120 may perform the same algorithm using the address key to determine the new address of proxy 120. The address of proxy 120 may be updated at application 112. This may be done in response to a scheduled time or this may be done in response to determining that proxy 120 is no longer at the previously known address. Application 112 may send a request for access to network 140 to proxy 120 at the new address. In some embodiments, this may make it difficult for malware that may be present on endpoint 110 to gain access to network 140. For example, malware may be able to communicate with proxy 120. If the address of proxy 120 changes, the malware must be able to keep up with those changes in order to continue communication. As such, this may reduce the amount of malware that may effectively communicate with network 140 even if present on endpoint 110.

In another example operation of proxy 120, a new address for proxy 120 may be determined. The new address may be determined in a variety of ways in some embodiments. The new address may be algorithmically determined by proxy 120. Such algorithms may or may not use a random or pseudorandom component. The address may be determined from a predefined list.

Endpoint 110 may be updated with the new address of proxy 120. Proxy 120 may send endpoint 110 the new address. Endpoint 110 may have a predefined location or a set of predefined locations where endpoint 110 may retrieve the updated address. Certain applications 112 may be responsible for retrieving or receiving the new address. In some embodiments, a particular application 112 may authenticate endpoint 110 before being allowed to retrieve or receive the new address. In some embodiments, the new address that is received or retrieved may be encrypted.

Proxy 120 may receive a request for access to network 140 from endpoint 110 at the new address. As a result, for example, the address of proxy 120 may be changed and valid applications 112 may still be able to reach proxy 120 in order to gain access to network 140. By changing the address of proxy 120, this may increase the difficulty of malware that may reside on endpoint 110 from exploiting proxy 120. For example, malware may be able to communicate with proxy 120 by perhaps knowing an address that has previously been used for proxy 120. If the address of proxy 120 changes, the malware must be able to keep up with those changes. As such, this may reduce the amount of malware that may effectively communicate with network 140 even if present on endpoint 110.

In some embodiments, malware residing on endpoint 110 may attempt to send or receive information to or from network 140. The operations performed by proxy 120 discussed above may, in some cases, prevent malware residing on endpoint 110 from accessing network 140. This may limit the damage such malware may be able to inflict even if the malware resides on endpoint 110. For example, by preventing access to network 140, proxy 120 may prevent such malware from sending sensitive information collected from endpoint 110. As another example, such malware may not be able to spread to other endpoints as a result of not being able to access network 140. As yet another example, proxy 120 may prevent such malware from sending messages such as spam using endpoint 110.

In some embodiments, the operations of proxy 120 discussed above may allow for malware residing on endpoint 110 to be detected. For example, if proxy 120 denies one or more requests for access to network 140 from endpoint 110 based on the operations discussed above, proxy 120 may alert an administrator of system 100 or trigger a scan for malware of endpoint 110. Proxy 120 may provide information to the administrator or for the scan based on the received requests for access to network 140 in order to further facilitate the detection and/or elimination of malware from endpoint 110.

In some embodiments, operations of proxy 120 discussed involving access using a key may provide an enhancement to secure access to a network. Forcing applications (such as application 112) to generate compliant keys provides a finer control over access to network 140. For application 112 to access network 140, for example, they may be required not only to be installed but to receive proper configuration on endpoint 110. This may make it substantially more difficult for malware to access network 140 even when installed on endpoint 110.

In some embodiments, some or all of the above-discussed operations of proxy 120 may be implemented or performed by software residing on endpoint 110. For example, application 112 may request access to network 140 from software on endpoint 110. Such software may perform similar types of analysis or actions as those performed by proxy 120 described above in determining whether to allow application 112 to access network 140.

Figure 2:
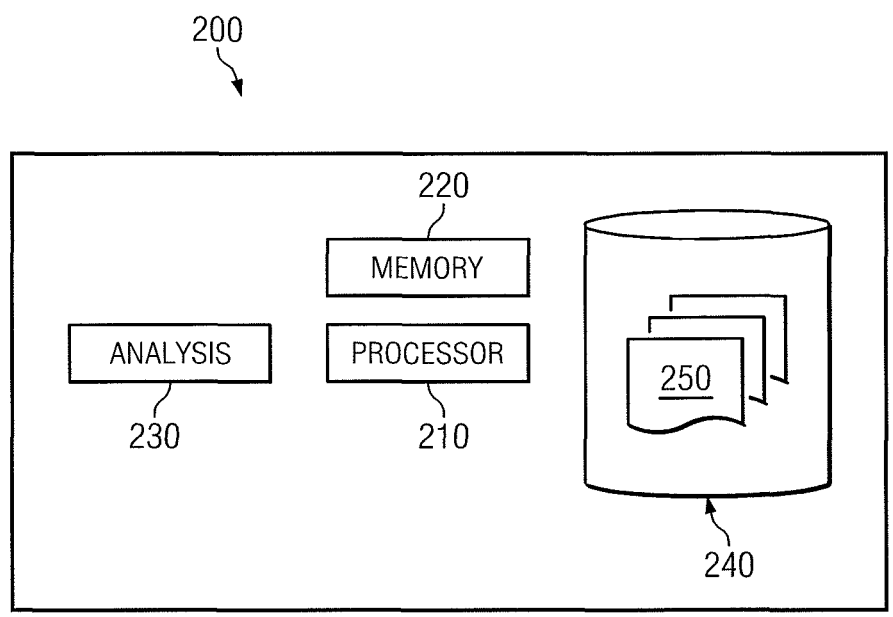
FIG. 2 illustrates one embodiment of a proxy that may provide enhanced security when accessing a network.

FIG. 2 illustrates one embodiment of proxy 200 that may be used to provide enhanced security when accessing a network, such as network 140 of FIG. 1. The proxy may include processor 210, memory 220, analysis module 230, and database 240. Database 240 may include one more policies 250. Processor 210 and memory 220 may be implemented as discussed in FIG. 3 with respect to processors 312 and memory 316. In some embodiments, databases 240, 290 and 295 may be implemented using a variety of database structures. The databases may be row-oriented or column-oriented. It may include relational databases and/or object-oriented databases. Database 240 may be indexed and accessed in a variety of manners, including by utilizing an operating system or through one or more networks. In some embodiments, database 240 may be implemented in one database such that separate tables within the database may be used to store the information contained in database 240.

In some embodiments, analysis module 230 may include one or more programs that provide proxy services. Such programs may access one or more of polices 250 while processing requests for access to a network. By accessing one or more of polices 250, the programs may: analyze header information associated with such requests, generate random keys, change an address (such as a network address) of proxy 200, notify an endpoint of the address of proxy 200, determine instructions that should be performed by an application before granting the application access to the network, analyze privilege information of users attempting to access a network, and other suitable functions. In some embodiments, such functions may be provided in multiple modules.

In some embodiments, policies 250 may govern access to a network. For example, policies 250 may indicate whether headers contained in requests for network access received by proxy 200 include expected information based on characteristics of the application (such as the application's name, version, or type). As another example, policies 250 may indicate instructions that should be sent to an application requesting access to a network. In some embodiments, policies 250 may indicate what characteristics an application should have in order to be considered compliant and be granted access to a network. Such characteristics may be determined by proxy 200 from a request for access to a network submitted by the application. Further, one or more polices 250 may indicate a manner in which proxy 200 should determine a new address for itself. For example, policies 250 may specify that a key should be used in conjunction with an algorithm or policies 250 may specify a location or service where proxy 200 may retrieve the new address. In some embodiments, the new address may be encrypted.

Figure 3:
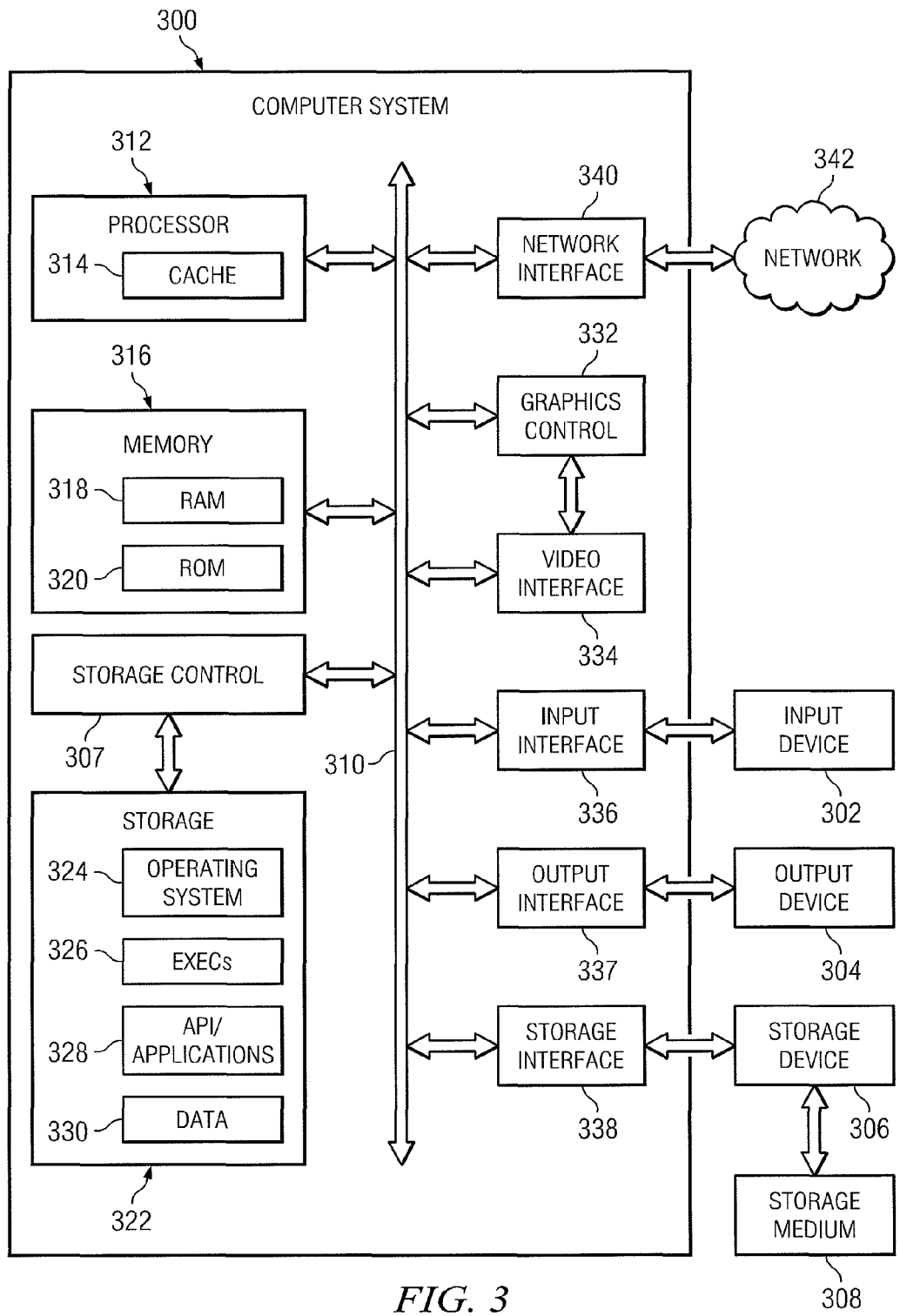
FIG. 3 illustrates an example computer system suitable for implementing one or more portions of particular embodiments.

FIG. 3 illustrates an example computer system 300 suitable for implementing one or more portions of particular embodiments. Although the present disclosure describes and illustrates a particular computer system 300 having particular components in a particular configuration, the present disclosure contemplates any suitable computer system having any suitable components in any suitable configuration. Moreover, computer system 300 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Endpoint 110, proxy 120, and elements of infrastructure 130 of FIG. 1 as well as the elements discussed in FIG. 2 may be implemented using all of the components, or any appropriate combination of the components, of computer system 300 described below.

Computer system 300 may have one or more input devices 302 (which may include a keypad, keyboard, mouse, stylus, or other input devices), one or more output devices 304 (which may include one or more displays, one or more speakers, one or more printers, or other output devices), one or more storage devices 306, and one or more storage medium 308. An input device 302 may be external or internal to computer system 300. An output device 304 may be external or internal to computer system 300. A storage device 306 may be external or internal to computer system 300. A storage medium 308 may be external or internal to computer system 300.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 312 (or central processing units (CPUs)). A processor 312 may contain a cache 314 for temporary local storage of instructions, data, or computer addresses. Processors 312 are coupled to one or more storage devices, including memory 316. Memory 316 may include random access memory (RAM) 318 and read-only memory (ROM) 320. Data and instructions may transfer bidirectionally between processors 312 and RAM 318. Data and instructions may transfer unidirectionally to processors 312 from ROM 320. RAM 318 and ROM 320 may include any suitable computer-readable, non-transitory, storage media.

Computer system 300 includes fixed storage 322 coupled bi-directionally to processors 312. Fixed storage 322 may be coupled to processors 312 via storage control unit 307. Fixed storage 322 may provide additional data storage capacity and may include any suitable computer-readable storage media. Fixed storage 322 may store an operating system (OS) 324, one or more executables (EXECs) 326, one or more applications or programs 328, data 330 and the like. Fixed storage 322 is typically a secondary storage medium (such as a hard disk) that is slower than primary storage. In appropriate cases, the information stored by fixed storage 322 may be incorporated as virtual memory into memory 316. In some embodiments, fixed storage 322 may include network resources, such as one or more storage area networks (SAN) or network-attached storage (NAS).

Processors 312 may be coupled to a variety of interfaces, such as, for example, graphics control 332, video interface 334, input interface 336, output interface 337, and storage interface 338, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 340 may couple processors 312 to another computer system or to network 342. Network interface 340 may include wired, wireless, or any combination of wired and wireless components. Such components may include wired network cards, wireless network cards, radios, antennas, cables, or any other appropriate components. With network interface 340, processors 312 may receive or send information from or to network 342 in the course of performing steps of some embodiments. Some embodiments may execute solely on processors 312. Some embodiments may execute on processors 312 and on one or more remote processors operating together.

In a network environment, where computer system 300 is connected to network 342, computer system 300 may communicate with other devices connected to network 342. Computer system 300 may communicate with network 342 via network interface 340. For example, computer system 300 may receive information (such as a request or a response from another device) from network 342 in the form of one or more incoming packets at network interface 340 and memory 316 may store the incoming packets for subsequent processing. Computer system 300 may send information (such as a request or a response to another device) to network 342 in the form of one or more outgoing packets from network interface 340, which memory 316 may store prior to being sent. Processors 312 may access an incoming or outgoing packet in memory 316 to process it, according to particular needs.

Some embodiments involve one or more computer-storage products that include one or more tangible, computer-readable storage media that embody software for performing one or more steps of one or more processes described or illustrated herein. In some embodiments, one or more portions of the media, the software, or both may be designed and manufactured specifically to perform one or more steps of one or more processes described or illustrated herein. In addition or as an alternative, in some embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In some embodiments, software may be machine code which a compiler may generate or one or more files containing higher-level code which a computer may execute using an interpreter.

As an example and not by way of limitation, memory 316 may include one or more tangible, computer-readable storage media embodying software and computer system 300 may provide particular functionality described or illustrated herein as a result of processors 312 executing the software. Memory 316 may store and processors 312 may execute the software. Memory 316 may read the software from the computer-readable storage media in mass storage device 316 embodying the software or from one or more other sources via network interface 340. When executing the software, processors 312 may perform one or more steps of one or more processes described or illustrated herein, which may include defining one or more data structures for storage in memory 316 and modifying one or more of the data structures as directed by one or more portions the software, according to particular needs.

In some embodiments, the described processing and memory elements (such as processors 312 and memory 316) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

FIGS. 4-9 are flowcharts that illustrate some embodiments of the operation of a enhancing the security of accessing a network. In general, the steps illustrated in FIGS. 4-9 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-3.

Figure 4:
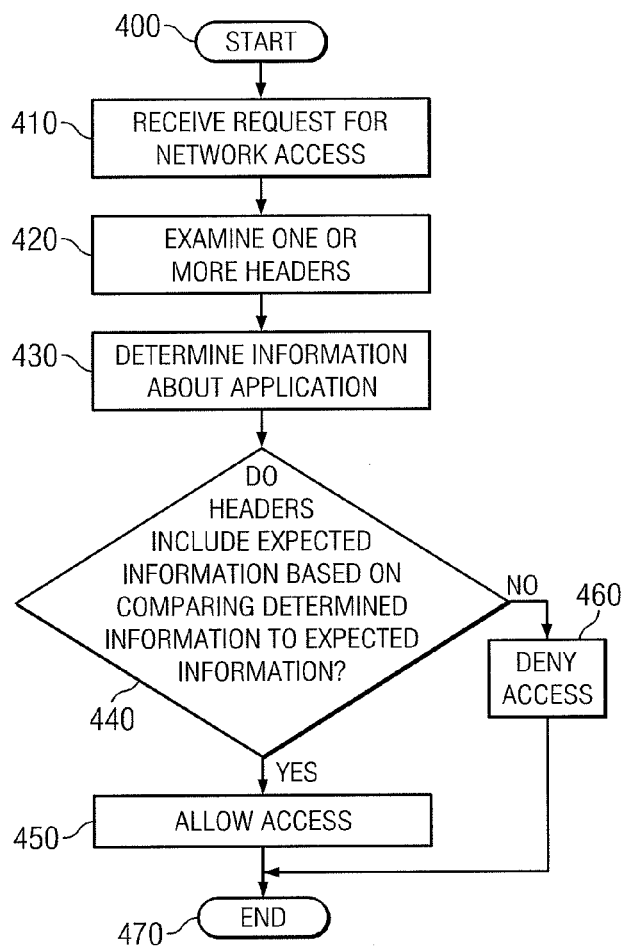
FIG. 4 illustrates an example method for providing enhanced security for network access using a proxy to examine headers.

FIG. 4 illustrates an example method for providing enhanced security for network access using a proxy to examine headers. In some embodiments, some or all of the steps described in FIG. 4 may be performed using endpoint 110 and proxy 120 of FIG. 1 as well as proxy 200 of FIG. 2. At step 410, in some embodiments, a request for network access is received at a proxy from an endpoint. The endpoint may be configured to send network requests through the proxy. The request may have been generated by an application on the endpoint. The request may be an attempt to: access a Web page, send or receive messages, upload or download one or more files, access a portion of a network, initiate a streaming media session (such as a streaming audio session or a streaming video session), initiate or join a teleconference or video conference, make or receive a VoIP call or any other suitable request involving access to a network (e.g., network 140 of FIG. 1).

In some embodiments, at step 420, the proxy may examine one or more headers present in the request of step 410. Such headers may vary, depending on the type of application at the endpoint that is requesting access to the network. The headers may also vary based upon the protocols used by the application at the endpoint. For example, certain protocols require information to be specified in the headers, such as the hypertext transfer protocol (HTTP). The headers may include information regarding application such as the name of the application, the type of the application, the version of the application, and other suitable information. The headers may also include parameters, settings, commands, and capabilities according to the protocol employed. For example, if HTTP is employed, one aspect of the headers received may include MIME types as well as information regarding the application (e.g., browser name and version). In some embodiments, at step 430, by examining the headers, such information regarding the application may be determined.

In some embodiments, at step 440, a determination is made whether the headers received at step 410 include expected information based on the information determined at step 430. The headers may be analyzed for both syntactical correctness and completeness. One or more policies may be referenced when making this determination. In some embodiments, based on the information determined about the application in step 430 such as the application's type, a policy may be selected and used to determine if the headers include expected information consistent with the information determined about the application.

For example, if the request received at step 410 was for a Web page, then the application that formulated the request may have been a Web browser. However, at this step it may be determined that the headers present in the request are not consistent with what is expected with a Web browser. For example, information expected to be present in the headers may not be present. As another example, the syntax of the headers may be inconsistent or incorrect, especially when compared to the expected contents of the header based on the name and version of the browser determined at step 430. As another example, the MIME types specified in the headers may also be compared to the expected contents of the headers (such as expected MIME types based on the name and/or type of the application specified in the header).

In some embodiments, examining such characteristics of the headers may allow for the detection of malware running on the endpoint and attempting to connect to a network. For example, the malware may be attempting to access a Web page or sending an e-mail message but would not properly form the headers since it is not truly a Web browser or an e-mail client. As another example, malware may be attempting to hide its traffic using protocols that a firewall may already be configured to allow (such as Web traffic, e-mail traffic, or instant messaging traffic). The types of inconsistencies that may be looked for include typographical errors, formatting discrepancies, version number discrepancies, incorrect specification of MIME types when compared to the name and version of the application specified in the headers, and whether expected headers are missing. Such attempts to spoof headers by malware may be detected.

If it is determined that the headers include expected information consistent with the information determined about the application at step 430, then, in some embodiments, the application will be allowed access to the network (step 450). The proxy may strip the some or all of the information in the headers when allowing access to the network at this step. If the headers do not include the expected information, then, in some embodiments, the request for access will be denied (step 460) and potential remedial measures may be launched, such as scanning the endpoint for malware. Other remedial measures may include sending a message to an administrator and/or preventing the endpoint from accessing any network resources, including the proxy. In some embodiments, these steps may prevent malware present on the endpoint from accessing the network. The malware may attempt to access the network through the proxy, but by examining the headers, it may be determined that the headers are inconsistent with what is expected based on the type of attempt to access the network (as described above). In some embodiments, by denying access to the network (as in step 460) based on such inconsistencies, malware may be prevented from accessing the network or sending information to the network.

Figure 5:
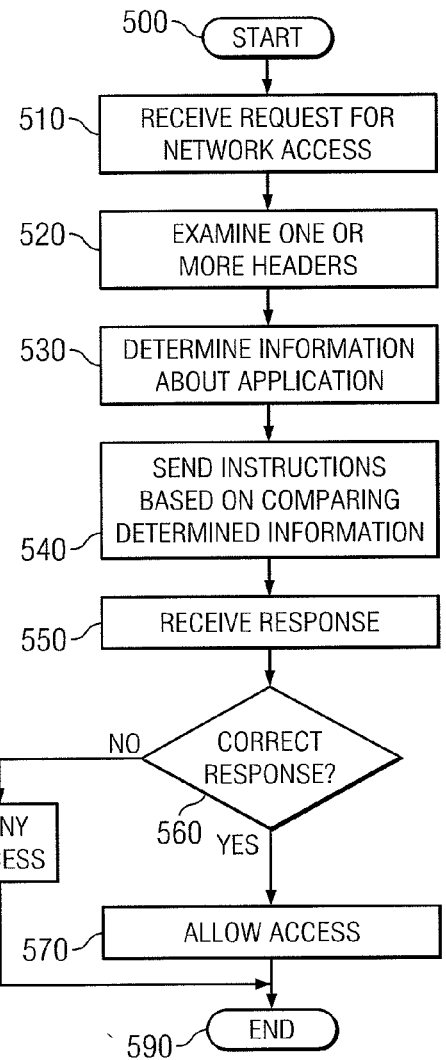
FIG. 5 illustrates an example method for providing enhanced security for network access using a proxy to verify the identity of an application.

FIG. 5 illustrates an example method for providing enhanced security for network access using a proxy to verify the identity of an application. In some embodiments, some or all of the steps described in FIG. 5 may be performed using endpoint 110 and proxy 120 of FIG. 1 as well as proxy 200 of FIG. 2.

In some embodiments, steps 510, 520, and 530, may be completed in the same or in a similar manner as step 410, 420, and 430 of FIG. 4. Generally, a request for network access from an endpoint is received by a proxy at step 510 and one or more headers within that request are analyzed at step 520. Information regarding the application (such as name, version, and/or type) may be determined at step 530.

At step 540, in some embodiments, instructions may be sent to the endpoint from the proxy. The instructions may be determined based on the information about the application determined at step 530. For example, the instructions may include code that the application should be capable of performing based on the information determined about the application, such as the application's type. Such instructions may be sent in order to validate that the application sending the request from step 510 can perform activities that are typical of the application's type. For example, if the request transmitted at step 510 is a request for a Web page, then it may be determined at step 530 that the application appears to be a browser. In such an example, the instructions sent at step 540 may include instructions that a browser should be able to perform (such as executing JavaScript code, HTML code, Active-X code, XUL code, macros, Applescript, or other suitable scripting language, programming language, or set of instructions that the application can execute). The types and numbers of instructions to be sent may be determined based on one or more policies and may be accessed by the proxy once the information about the application is determined (at step 530).

In some embodiments, the instructions sent at step 540 may not be performed by a user of the application but by the application itself. In such a manner, the instructions may serve to test that the application has the capabilities normally present in that type of application. For example, if the request transmitted at step 510 is a request for a Web page, then the instructions sent may test whether the application has capabilities normally found in a Web browser, such as a JavaScript engine. Continuing the example, the instructions sent may not include a prompt for a password since such a prompt may not test whether the application is actually a Web browser and requests performance by a user.

At step 550, in some embodiments, the proxy may receive one or more responses from the endpoint to the instructions sent at step 540. The responses may be results of the instructions of step 540. The responses can be relatively simple or complex. For example, if the instructions sent at step 540 were instructions that requested the application to perform certain mathematical calculations, the response may simply be a number. As another example, the response may be a string of text if the instructions sent at step 540 were instructions that called for the manipulation or generation of text. More complicated responses may also be provided for. For example, binary objects, encrypted data, images, video files, audio files, or other suitable responses may be provided at step 550.

At step 560, these responses are analyzed to determine whether or not they are correct. The one or more policies, some of which may have been used at step 540, may be used to determine if the response or responses received at step 550 are correct. In some embodiments, responses may not be received by the proxy because the application may not have been able to perform the instructions sent at step 540. If malware on the endpoint were to have sent the request transmitted at step 510, then the malware may be attempting to access a network resource by pretending that it is another application, such as a Web browser. Hence the request to perform instructions may be difficult to impossible for the malware to complete since it is truly not a Web browser but merely cloaking itself to be a Web browser.

If the responses are correct, then the application may be allowed access to the network as in step 570. If the responses are not correct, then the application may be denied access to the network as in step 580. In some embodiments, if it is determined that the responses are correct, the proxy may determine to send further instructions that require responses. In such cases, steps 540 through 560 may be repeated as needed. Whether or not to repeat these steps, and how many times the steps should be repeated, may be determined by one or more policies that may be selected based on the information about the application determined in step 530. In some embodiments, if the responses are correct, a certificate or cookie may be given to the application so that it may continue to access the network.

In some embodiments, by requiring an application to perform instructions the identity of the application may be verified. This may prevent, for example, malware that cloaks itself as being a Web browser or other forms of application from being able to fool the proxy. In such cases, although an endpoint may be compromised by malware, the effect of the malware may be limited using the proxy as in the steps described in FIG. 5. If it is determined that the response is incorrect, then a scan may be triggered to detect whether malware is running on the endpoint.

The steps of FIGS. 4 and 5, in some embodiments, may be combined. For example, the proxy may examine the headers of the request to see if there are any inconsistencies with the type of application determined using the headers (as described in steps 430 and 440) as well as send instructions for the application to perform and to evaluate whether or not the responses to those instructions were correct (as in steps 540 through 560). In this manner, malware may be forced to perform other complicated actions in order to access a network rather than merely spoofing header information. For example, these techniques may prevent malware from simply making a request for a Web page and instead force the malware to attempt to highjack a valid application on the endpoint. This is much more challenging and is also much more detectable by malware scans, thus putting the malware in danger of being detected.

Figure 6:
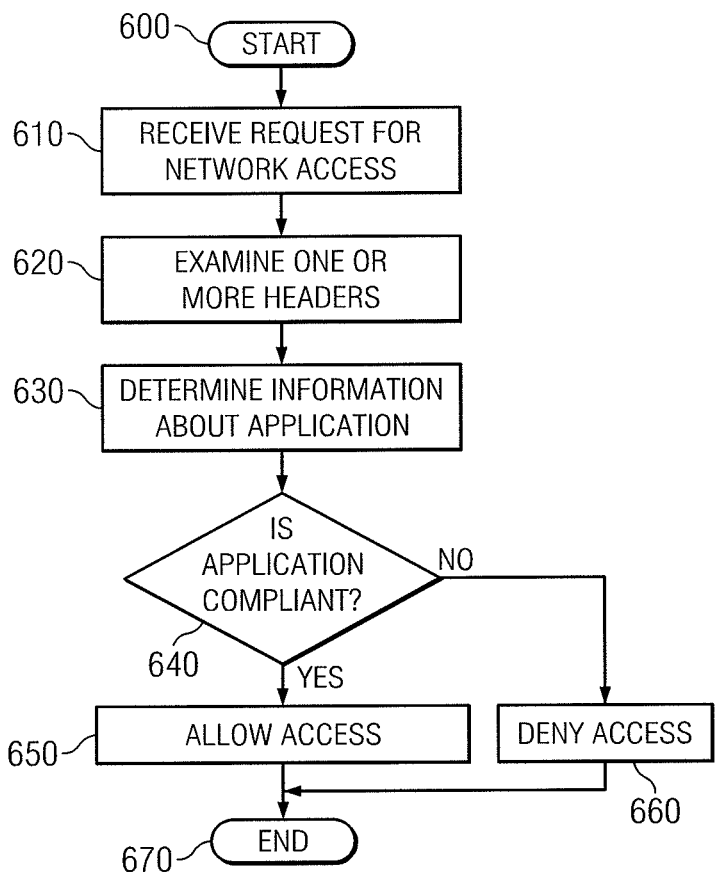
FIG. 6 illustrates an example method for providing enhanced security for network access using a proxy to verify compliance of an application.

FIG. 6 illustrates an example method for providing enhanced security for network access using a proxy to verify compliance of an application. In some embodiments, some or all of the steps described in FIG. 6 may be performed using endpoint 110 and proxy 120 of FIG. 1 as well as proxy 200 of FIG. 2.

In some embodiments, steps 610, 620, and 630, may be completed in the same or in a similar manner as step 410, 420, and 430 of FIG. 4. Generally, a request for network access from an endpoint is received by a proxy at step 610 and one or more headers within that request are analyzed at step 620. Information regarding the application (such as name, version, and type) may be determined at step 630.

At step 640, in some embodiments, it may be determined whether the information determined at step 640 indicates that the application requesting access to the network is compliant with one or more policies. For example, based on the application type, application name, or application version, or other information regarding the application or the endpoint, a one or more policies may be selected which may specify attributes that the application should have in order to gain access to the network. This information may be compared to the headers present in the request transmitted at step 610. For example, it may be determined that only a particular version of an application may be granted access to the network. As another example, the application may have the correct version number but may not have the most recent patches or updates installed. Such information of the application may be determined at step 630 and compared to the version and/or other requirements specified in the policy of step 640. As another example, permissions associated with a user of the application may be received by the proxy and compared to the policy before allowing network access. This may prevent users with administrative or other types of privileges from accessing the network (such as browsing the Web). Suitable plugins or other code may be present on the endpoint to send information such as user privilege or identity information to the proxy. Other examples of compliance criteria may include appropriate protocol support, security measures, application types, application names, or other suitable criteria for allowing an application to access the network.

If it is determined that the application is compliant, then the application may be allowed access to the network, as in step 650. If it is determined that the application is not compliant, then the application may be denied access to the network as in step 660. In some embodiments, if the application is not compliant as in step 660, further action may be taken at the endpoint. For example, a scan for malware may be initiated or a scan for unapproved applications may be initiated. A message regarding the fact that the application was not compliant may be sent to an administrator. The application may be sent to a location where resources may be acquired to put the application into compliance. For example, a non-compliant browser may be sent to a Web page where suitable upgrades and/or patches may be acquired. Other suitable actions may be performed in response to determining if the application is not compliant.

Figure 7:
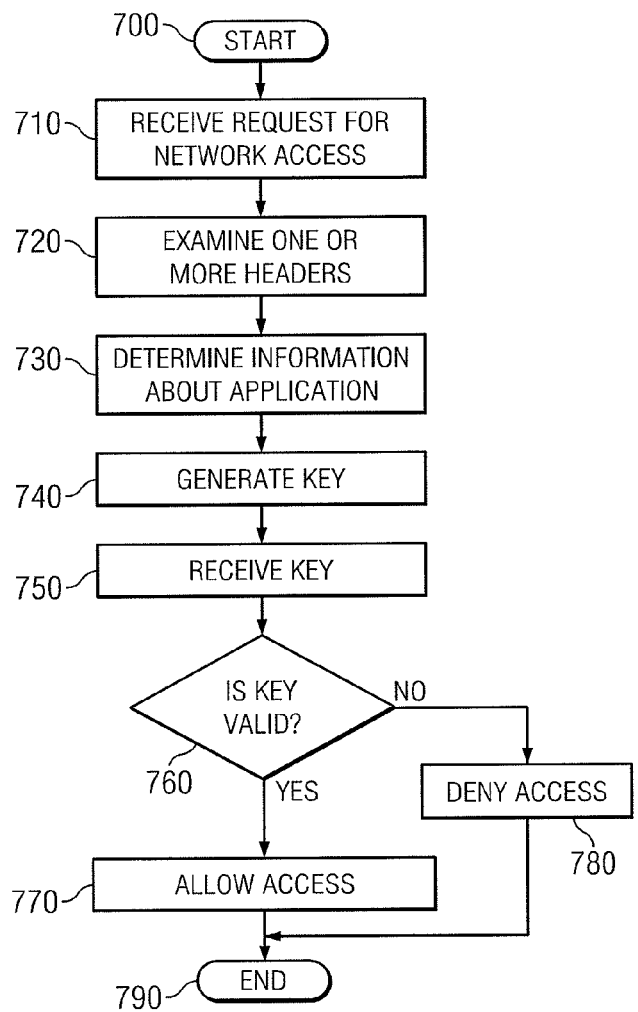
FIG. 7 illustrates an example method for providing enhanced security for network access using a proxy to verify a key transmitted by an application.

FIG. 7 illustrates an example method for providing enhanced security for network access using a proxy to verify a key transmitted by an application. In some embodiments, some or all of the steps described in FIG. 7 may be performed using endpoint 110 and proxy 120 of FIG. 1 as well as proxy 200 of FIG. 2.

In some embodiments, steps 710, 720, and 730, may be completed in the same or in a similar manner as step 410, 420, and 430 of FIG. 4. Generally, a request for network access from an endpoint is received by a proxy at step 710 and one or more headers within that request are analyzed at step 720. Information regarding the application (such as name, version, and type) may be determined at step 730.

At step 740, in some embodiments, the proxy may generate a key. The key may be generated based on an algorithm stored at the proxy and that is known to the application. The key may be pseudorandom in that it uses both a randomly generated item or seed and an algorithm is applied to the randomly generated number or seed to produce the key. Such criteria for determining the key may be transmitted between the application and the proxy previously. In some embodiments, the criteria for generating the key may be determined when the proxy and/or the application are configured. The key may be static and determined at both the application and the proxy previously. In such cases, generating the key at this step may include retrieving the key from a local or remote location.

At step 750, in some embodiments, a key may be received by the proxy from the application. In some cases, the key received at step 750 may actually be received with the request for network access received at step 710. In some situations, the key may be received by the proxy before the proxy generates the key in step 740. The key may be generated by the application requesting the access to the network or by some other application on the endpoint and merely used by the application requesting access to the network. For example, a browser plugin may be used to generate the key. Examples of such plugins may include those created using Active-X code, XUL code, JavaScript, or other suitable techniques for developing plugins. As another example, one or more policies at the endpoint and/or at the proxy may be used to determine the key or keys used by the application and/or the proxy. The key may be static and determined at both the application and the proxy previously. In such cases, the key may be retrieved from a local or remote location.

At step 760, in some embodiments, it may be determined whether the key is valid. One or more policies may be used to determine whether or not the key is valid. The one or more policies may be selected based on the information determined about the application at step 730. For example, separate keys or types of keys may be specified by the policies depending on the name, type, and/or version of the application. If the key is valid, then the application may be allowed access, such as at step 770. In some embodiments, the proxy may strip one or more headers from the request as it allows it to reach the network so as to prevent the key from being disclosed outside of the proxy. If the key is not valid then the application may be denied access, such as at step 780. In some embodiments, this may provide an enhancement to secure access to a network. Forcing applications to generate compliant keys provides a finer control over access to the network. For applications to access the network, for example, they may be required not only to be installed but to receive proper configuration. This may make it substantially more difficult for malware to access the network even when installed on an endpoint that would otherwise have access to the network. In situations where access is denied, further steps may be taken. For example, if the key is not valid the application may be directed to resources that could provide compliance. The browser may be redirected to a Web page where the appropriate resources may be acquired in order to generate a valid key. One or more administrators may be contacted indicating the inability of the application to generate a valid key.

In some embodiments, the proxy may be configured to detect repeated attempts by an application to access the network yet provide an invalid key or not to provide a key at all. This may be indicative of malware and may cause a scan to be done on the endpoint or may cause an administrator to be notified. By reducing the opportunities for malware to gain access to the network, malware must then attempt to co-opt an application that it does have the capability to generate valid keys. This is substantially more difficult and reduces the number of malware that may be successful in reaching the network. Further, attempts to take advantage of applications are easier to detect and thus using the steps discussed above, enhanced security is provided.

Figure 8:
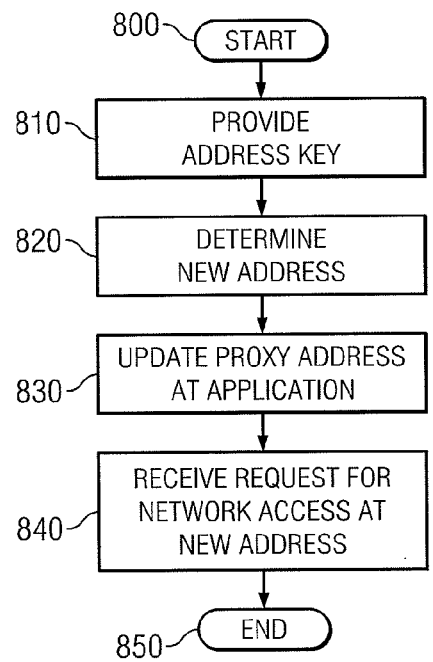
FIG. 8 illustrates an example method for a proxy dynamically changing its address.

FIG. 8 illustrates an example method for a proxy dynamically changing its address. At step 810, in some embodiments, an address key is provided. An address key may be provided to the proxy and to the endpoint or to an application on the endpoint. As an example, the address key may be a random element or number or some form of a unique identifier (such as a Media Access Control identifier). The address key may be a seed which may be used to determine a new address. The address key may be retrieved by the application and/or the proxy from a remote location. In some embodiments, the address key may be a static value that is present at the proxy and/or the application. As another example, the address key may be generated by the proxy and then transmitted to the application.

At step 820, in some embodiments, a new address for the proxy may be determined. The new address may be determined based on the address key generated at step 810. The address that is generated may be any form of a network address, including items such as an IP address or a Domain Name System (DNS) address. In some situations, both the proxy and the application will determine the new address based on the address key at step 810. For example, both the application and the proxy may perform the same algorithm using the address key to determine the new address of the proxy. The new address may be determined at a scheduled time or at a random time. The application and/or the proxy may use plug-ins or other forms of software to determine the new address. For example, the use of a random number may be used to select from amongst a list of potential addresses for the proxy. As another example, portions of the address of the proxy may be fixed while the new address may be determined by selecting new values for variable portions of the address of the proxy. In some embodiments, the proxy may participate in a "fast flux" DNS technique. This may include single-flux and/or double-flux techniques. Such techniques may include repeatedly registering and deregistering the proxy's IP address with various DNS addresses. A proxy may perform such registrations and deregistrations with other proxies. In some embodiments, this may cause the DNS addresses to have multiple IP addresses associated with them. This may make it difficult to determine the actual IP address of each proxy, which may prevent malware from determining the actual IP address of the proxy by examining DNS records. Other suitable techniques for determining a network address may be used.

At step 830, in some embodiments, the address of the proxy may be updated at the application. This may be done in response to a scheduled time or this may be done in response to determining that the proxy is no longer at the previously known address. In some cases, the application may retrieve the new address from a known location, such as a proxy with a fixed address. The new addresses retrieved in this manner may be encrypted. The application may also compute the new address using techniques such as those described above. The application may use a plugin to determine the new address as needed so as not to disrupt the performance or operation of the application. For example, a browser plugin may be used to determine the new address so that a browsing session may not be interrupted. Using the updated proxy address, at step 840, in some embodiments, the application may send a request for network access to the proxy at the new address. In some embodiments, this may make it difficult for malware on the endpoint to gain access to a network. For example, malware may be able to communicate with the proxy by perhaps knowing an address that has previously been used for the proxy. If the proxy's address changes, the malware must be able to keep up with those changes to be able to find the new proxy address. Malware capable of keeping up with such changes may be more complicated to write and possibly easier to detect since such malware likely is more complex. As such, this may reduce the amount of malware that may effectively communicate with a network even if present on the endpoint. This may also provide a manner in which the security of access to a network may be enhanced without unduly restricting certain applications. In some embodiments, if a former address for the proxy is used by an application at the endpoint, the application should be further investigated. Such an application may be malware. A scan for the application may be initiated or an administrator may be contacted. In some embodiments, sensors may be implemented using hardware and/or software to detect attempts to access former addresses and to facilitate responses to such attempts (such as alerts or scans).

Figure 9:
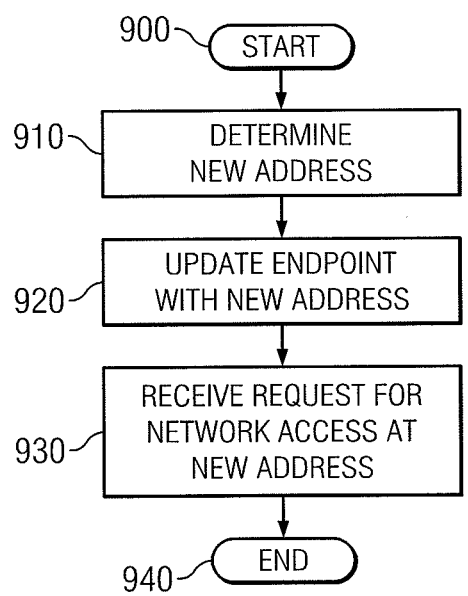
FIG. 9 illustrates an example method for a proxy changing its address.

FIG. 9 illustrates an example method for a proxy changing its address. At step 910, in some embodiments, a new address for the proxy may be determined. The new address may be determined in a variety of ways in some embodiments. The new address may be algorithmically determined by the proxy. Such algorithms may or may not use a random or pseudorandom component. The address may be determined from a predefined list. The techniques described at step 820 in FIG. 8 may also be used to determine the address at step 910.

At step 920, in some embodiments, an endpoint may be updated with the new address of the proxy. The proxy may send the endpoint the new address. The endpoint may have a predefined location or a set of predefined locations where the endpoint may retrieve the updated address. Certain applications residing in the endpoint may be responsible for retrieving or receiving the new address. In some embodiments, an application on the endpoint may authenticate the endpoint before being allowed to retrieve or receive the new address. In some embodiments, the retrieved new address may be encrypted.

At step 930, in some embodiments, the proxy may receive a request for network access from the endpoint at the new address determined at step 910. As a result, for example, the address of the proxy may be changed and valid applications may still be able to reach the proxy in order to gain access to a network. By changing the address of the proxy, this increases the difficulty of malware that may reside on the endpoint from exploiting the proxy. In some embodiments, this may make it difficult for malware on the endpoint to gain access to a network. For example, malware may be able to communicate with the proxy by perhaps knowing an address that has previously been used for the proxy. If the proxy's address changes, the malware must be able to keep up with those changes. If possible, it may make the malware much more complicated to write and possibly easier to detect since the malware must be more complex. As such, this may reduce the amount of malware that may effectively communicate with a network even if present on the endpoint. This may also provide a manner in which the security of access to a network may be enhanced without unduly restricting certain applications.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
receiving, at a proxy controlling access to a network, a request for access to the network from an application on an endpoint;
analyzing headers of the request received at the proxy from the application;
identifying, by the proxy, the application on the endpoint sending the request based on the analysis of the headers of the request received at the proxy from the application;
selecting a policy to reference for indication of characteristics of the application to be considered compliant for granting access to the network based on the analysis of the headers;
determining, by the proxy, whether the one or more headers of the request received at the proxy from the application on the endpoint include characteristics of the application to be considered compliant for granting access to the network based on the analysis by the proxy of one or more headers;
in response to determining that the one or more headers do not include characteristics of the application to be considered compliant for granting access to the network, denying, by the proxy, the request for access of the endpoint to the network; and
in response to determining that the one or more headers include characteristics of the application to be considered compliant for granting access to the network, forwarding, by the proxy, the request of the endpoint to the network on behalf of the application,
wherein determining that the one or more headers do not include characteristics of the application to be considered compliant for granting access to the network comprises determining:
that at least one expected header is missing;
that the one or more headers comprises at least one typographical error; and
that the one or more headers comprises MIME types that are inconsistent with the determined information about the application, and
wherein forwarding the request to the network on behalf of the application in response to determining that the one or more headers include characteristics of the application considered compliant for granting access to the network comprises:
determining, by the proxy, that the one or more headers comprise the characteristics of the application considered compliant for granting access to the network;
receiving, at the proxy, a key from the application; and
forwarding, in response to validating the received key by the proxy, the request to the network on behalf of the application.

2. A system, comprising:
at least one memory;
at least one processor operable to:
receive, at a proxy controlling access to a network, a request for access to the network from an application on an endpoint;
analyze headers of the request received at the proxy from the application;
identify the application on the endpoint sending the request based on the analysis of the headers of the request received at the proxy from the application;
select a policy to reference for indication of characteristics of the application to be considered compliant for granting access to the network based on the analysis of the headers;
determine, by the proxy, whether the one or more headers of the request received at the proxy from the application on the endpoint include characteristics of the application to be considered compliant for granting access to the network based on the analysis by the proxy of one or more headers;
in response to determining that the one or more headers do not include characteristics of the application to be considered compliant for granting access to the network, deny, by the proxy, the request for access of the endpoint to the network; and
in response to determining that the one or more headers include characteristics of the application considered compliant for granting access to the network, forward, by the proxy, the request of the endpoint to the network on behalf of the application, wherein the at least one processor determines that the one or more headers do not include characteristics of the application to be considered compliant for granting access to the network by determining:

that at least one expected header is missing;

that the one or more headers comprises at least one typographical error; and that the one or more headers comprises MIME types that are inconsistent with the determined information about the application, and wherein the at least one processor forwards the request to the network on behalf of the application in response to determining that the one or more headers include characteristics of the application considered compliant for granting access to the network by:

determining, by the proxy, that the one or more headers comprise the characteristics of the application considered compliant for granting access to the network;

receiving, at the proxy, a key from the application; and forwarding, in response to validating the received key by the proxy, the request to the network on behalf of the application.

3. The system of claim 2, wherein the application comprises a Web browser.

4. The system of claim 2, wherein the at least one processor is operable to:

determine version information about the application by examining the one or more headers;

determine whether the application complies with at least one policy based on the determined version information about the application;

in response to determining that the application does not comply with the at least one policy, deny, by the proxy, the request for access to the network; and in response to determining that the application does comply with the at least one policy, forward, by the proxy, the request to the network on behalf of the application.

5. At least one non-transitory computer-readable medium comprising code, that, when executed, is operable to:

receive, at a proxy controlling access to a network, a request for access to the network from an application on an endpoint;

analyze headers of the request received at the proxy from the application;

identify the application on the endpoint sending the request based on the analysis of the headers of the request received at the proxy from the application;

select a policy to reference for indication of characteristics of the application to be considered compliant for granting access to the network based on the analysis of the headers;

determine, by the proxy, whether the one or more headers of the request received at the proxy from the application on the endpoint include characteristics of the application to be considered compliant for granting access to the network based on the analysis by the proxy of one or more headers;

in response to determining that the one or more headers do not include characteristics of the application to be considered compliant for granting access to the network, deny, by the proxy, the request for access of the endpoint to the network; and in response to determining that the one or more headers include characteristics of the application considered compliant for granting access to the network, forward, by the proxy, the request of the endpoint to the network on behalf of the application, wherein determining that the one or more headers do not include characteristics of the application to be considered compliant for granting access to the network comprises determining:

that at least one expected header is missing;

that the one or more headers comprises at least one typographical error; and that the one or more headers comprises MIME types that are inconsistent with the determined information about the application, and wherein forwarding the request to the network on behalf of the application in response to determining that the one or more headers include characteristics of the application considered compliant for granting access to the network comprises:

determining, by the proxy, that the one or more headers comprise the characteristics of the application considered compliant for granting access to the network;

receiving, at the proxy, a key from the application; and forwarding, in response to validating the received key by the proxy, the request to the network on behalf of the application.

* * * * *